United States Patent

[11] 3,591,959

| [72] | Inventor | Heribert Kubis<br>Nurnberg, Germany |
|---|---|---|
| [21] | Appl. No. | 845,774 |
| [22] | Filed | July 29, 1969 |
| [45] | Patented | July 13, 1971 |
| [73] | Assignee | Maschinenfabrik Augsburg-Nurnberg<br>Aktiengesellschaft<br>Nurnberg, Germany |
| [32] | Priority | Aug. 7, 1968 |
| [33] | | Austria |
| [31] | | A 7734/68 |

[54] ENGINE EXHAUST GAS BRAKING
4 Claims, 3 Drawing Figs.

[52] U.S. Cl. .................................................. 60/13,
  60/29, 123/97 B
[51] Int. Cl. ......................................................F02b 37/00,
  F02d 9/00
[50] Field of Search .......................................... 60/13, 29;
  123/97 B

[56] References Cited
UNITED STATES PATENTS

| 2,674,086 | 4/1954 | Nichols | 60/13 |
|---|---|---|---|
| 3,423,926 | 1/1969 | Nancarrow | 60/13 |
| 3,430,436 | 3/1969 | Bader | 60/13 |

FOREIGN PATENTS

| 1,084,081 | 6/1960 | Germany | 60/13 |
|---|---|---|---|
| 953,933 | 4/1964 | Great Britain | 60/13 |

*Primary Examiner*—Douglas Hart
*Attorneys*—Francis D. Stephens and Hugo Huettig, Jr.

ABSTRACT: For an internal combustion engine brake, two exhaust pipes are connected to separate groups of cylinders, and an intake-air-supercharging turbine is joined to said pipes for being driven by the exhaust gases, a throttle valve is positioned between the cylinders and the turbine which is common to the pipes for bringing the pipes into gas-equalizing communication when the throttle valve closes off the turbine to brake the engine.

PATENTED JUL 13 1971
3,591,959
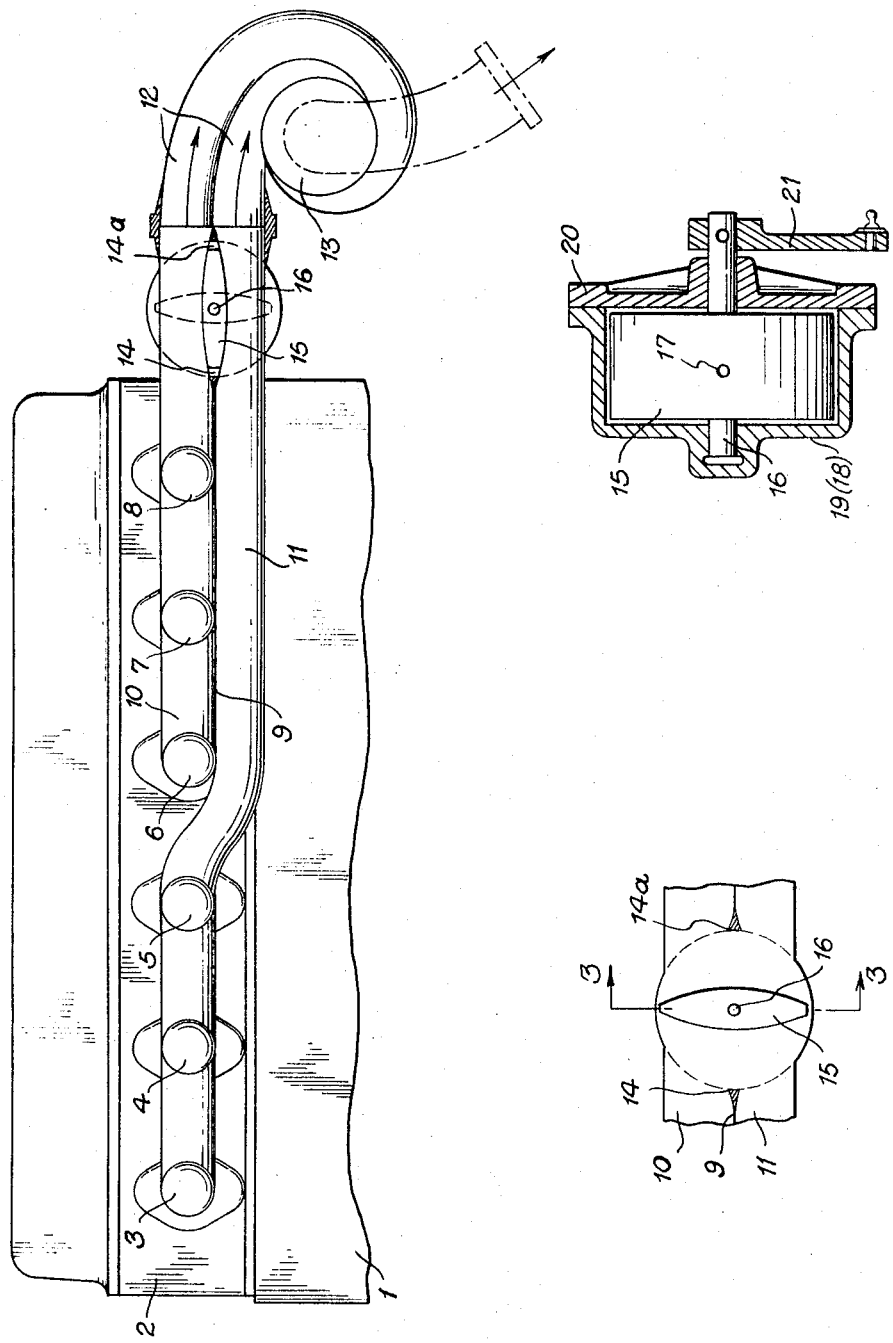
INVENTOR
Heribert Kubis

ENGINE EXHAUST GAS BRAKING

This invention relates to an exhaust gas throttle for braking the supercharged internal combustion engine by throttling the exhaust gases and in which the exhaust gases are conducted into two separate exhaust pipes from the cylinder head to the exhaust gas turbine.

Six- and eight-cylinder engines have been supercharged with intake air by means of an exhaust-gas-driven turbine according to the Buchi principle. In so doing, the engine exhaust gases are conducted through two separate exhaust pipes to the exhaust gas turbine which drives the supercharger, the separate exhaust pipes being connected to three cylinders displaced by 240° or to four cylinders which are displaced by 180° of the crankshaft. This arrangement favorably affects the drive for the exhaust gas turbine. In this arrangement, the pressure varies in each exhaust pipe during the period when the intake and exhaust valves of a cylinder are open at the same time, while the combustion chamber is cleaned by the intake air and the wall of the combustion chamber is cooled.

When such an engine was provided with a exhaust brake, the exhaust gas turbine was placed in the exhaust pipe between the engine and the exhaust gas throttle, that is, the throttle followed the turbine in the direction of the flow of exhaust gases. This arrangement had the disadvantage in that, during the braking process, the exhaust gas turbine was subjected to the full range of the pressure changes in the exhaust pipes and the turbine wheel seal was placed under high stress and therefore subjected to early wear and tear.

It has also been known to install an exhaust gas throttle in advance of the exhaust gas turbine in each of the exhaust pipes and to operate the two throttles together. However, in this case, the braking effect of the exhaust gases is considerably impaired since the middle pressure in each exhaust gas pipe, despite higher pressure peaks reached, is lower than the heretofore-described arrangement. This is because the gas volume in the two exhaust pipes is far too low. The high-pressure peaks reached are also a consequence of the subdivision into two exhaust pipes so that a pressure equalization is missing at just the time one cylinder has its intake and exhaust valve open.

The object of this invention is to eliminate the above disadvantages with as little structural changes and expense as possible and to produce an arrangement in which the exhaust gas turbine is not supplied with exhaust gases during exhaust gas braking, and at the same time to produce a pressure equalization in the exhaust pipes.

In general, this object is obtained in that the throttle member acting as an exhaust gas throttle is positioned between the two exhaust pipes in an open portion of the common wall between the coextensive portions of the two exhaust pipes. In open position, the exhaust gases from each pipe are separately fed to the exhaust gas turbine. In closed position, it places the two exhaust pipes into communication through the open section in the common wall. The throttle valve can be inserted in the exhaust pipes by means of a removable cover on the exhaust pipe or can be mounted in a special housing installed between the exhaust pipes and the intake pipes of the exhaust gas turbine.

The means by which the objects of this invention are obtained are described more fully with reference to the accompanying drawings in which:

FIG. 1 is a side view of a six-cylinder engine with the exhaust gas throttle and turbine according to this invention;

FIG. 2 is a schematic view of the throttle valve of FIG. 1 in closed braking position; and FIG. 3 is a cross-sectional view taken on the line 3-3 of FIG. 2.

As shown in FIG. 1, the engine has a cylinder block 1 and a cylinder head 2. The engine has exhaust gas ports 3, 4, 5, 6, 7 and 8, of which, and always corresponding to the order of ignition, three of the ports (3, 4 and 5) are coupled to exhaust pipe 11 and ports 6, 7 and 8 are coupled to pipe 10, with the pipes having a common wall 9 over their coextensive portions. The two exhaust pipes 10 and 11 communicate with the bifurcated intake opening of an exhaust gas turbine 13 for a supercharger, not shown. An open portion in the common center wall 9 extends between the edges 14 and 14a. A throttle valve 15 extends through the opening by being mounted on a shaft 16. As shown in FIG. 1, the throttle valve is in open position with the ends of the valve forming a continuation of the wall 9 between edges 14 and 14a.

FIG. 2 shows the throttle valve 15 in its closed or exhaust gas engine-braking position and in which position it closes off the flow of exhaust gases from exhaust pipes 10 and 11 to the exhaust gas turbine 13. However, at the same time, it opens communication between the exhaust pipes 10 and 11 through the open portion of the wall 9 adjacent the edge 14 so that the pressure in pipes 10 and 11 is equalized.

In FIG. 3, the throttle valve 15 is secured to the shaft 16 by means of a pin 17, the shaft extending through the sidewall 18 of the exhaust pipes 10 and 11, or through a housing 19 closed by a removable cover 20 which tightly seals the exhaust pipes 10 and 11 or the housing 19. A lever 21 is joined to the portion of shaft 20 extending through cover 20. This lever can be operated by a mechanical, hydraulic or pneumatic means, not shown.

The throttle valve 15 in FIG. 3 is rectangular but can also be circular or elliptical.

Having now described the means by which the objects of this invention are obtained,

I claim:

1. In an internal combustion reciprocating piston engine comprising a cylinder block containing a plurality of cylinders, a cylinder heat, a first exhaust pipe connected to some of the cylinders, a second exhaust pipe connected to the other cylinders, a common wall between coextensive portions of the two pipes, throttle valve means in said pipes for blocking flow therethrough to assist in braking said engine, and intake-air-supercharging turbine means joined to said pipes for being driven by the exhaust gases, the improvement in which the throttle valve means is positioned between the cylinders and the turbine means and is common to the two pipes for bringing the two pipes into gas-equalizing communication when the throttle valve means is in position for closing off said turbine means.

2. In an engine as in claim 1, said throttle valve means comprising a housing, a valve member rotatably mounted in said housing, and a cover removably closing said housing.

3. In an engine as in claim 1, said throttle valve means including a housing installed between said two pipes and said turbine means.

4. In an engine as in claim 2, said valve member putting the full cross-sectional areas of the two pipes in communication when in braking position.